US010425727B2

(12) United States Patent
Jost et al.

(10) Patent No.: US 10,425,727 B2
(45) Date of Patent: Sep. 24, 2019

(54) HEARING ASSISTANCE SYSTEM IN A MULTI-TALKER ACOUSTIC NETWORK

(71) Applicant: Sonova AG, Staefa (CH)

(72) Inventors: Timothée Jost, Auvernier (CH); Francois Marquis, Corminboeuf (CH)

(73) Assignee: Sonova AG, Stäfa (CH)

( * ) Notice: Subject to any disclaimer, the term of this patent is extended or adjusted under 35 U.S.C. 154(b) by 0 days.

(21) Appl. No.: 16/083,920

(22) PCT Filed: Mar. 17, 2016

(86) PCT No.: PCT/EP2016/055763
§ 371 (c)(1),
(2) Date: Sep. 11, 2018

(87) PCT Pub. No.: WO2017/157443
PCT Pub. Date: Sep. 21, 2017

(65) Prior Publication Data
US 2019/0090055 A1    Mar. 21, 2019

(51) Int. Cl.
*H04R 3/00* (2006.01)
*G10L 25/78* (2013.01)
(Continued)

(52) U.S. Cl.
CPC ............. *H04R 3/005* (2013.01); *G10L 25/21* (2013.01); *G10L 25/78* (2013.01); *G10L 25/84* (2013.01);
(Continued)

(58) Field of Classification Search
CPC . H04R 3/00; H04R 3/005; H04R 3/12; H04R 1/406; H04R 29/005; H04R 25/43;
(Continued)

(56) References Cited

U.S. PATENT DOCUMENTS 5,459,814 A    10/1995  Gupta et al.
6,549,630 B1*   4/2003  Bobisuthi ............... H03G 3/32
                                              381/106
(Continued)

FOREIGN PATENT DOCUMENTS

EP      2874410 A1     5/2015
WO      97/22117 A1    6/1997
WO   2008/148591 A1   12/2008

OTHER PUBLICATIONS

International Search Report and Written Opinion; Application No. PCT/EP2016/055763; Filed Mar. 17, 2016; Applicant: Sonova AG; dated Dec. 20, 2016; 17 pages.

*Primary Examiner* — Thang V Tran

(57) ABSTRACT

There is provided a multi-talker acoustic network system for providing hearing assistance to a user, comprising at least two table microphone units (10, 12) for capturing audio signals from a speaker's voice, each comprising a microphone arrangement (30) having an omnidirectional characteristic, a VAD (32) for detecting voice activity of the microphone arrangement and a transmitter (36) for transmitting the captured audio signals via a wireless audio link (40), a control unit (34) for selecting one of tire table microphone units as the presently active microphone unit, wherein the control unit is configured to select, in case that at a time only for one of the table microphone units voice activity is detected, that one of the table microphone units as the presently active microphone unit, and to select, in case that at a time for more than one of the table microphone units voice activity is detected, at least for a certain time period that one of the table microphone units as the presently active microphone unit which has detected the voice activity first as the presently active microphone unit, wherein the system is configured to maintain the selection of the presently active microphone unit with a release time, and a hearing assis- (Continued)

tance device (20, 22) to be worn by the user, comprising a receiver unit (42) for receiving audio signals captured by the presently active microphone unit and an output transducer (44) for stimulation of the user's hearing according to the received audio signals, wherein the system is configured to prevent audio signals of the table microphone unit(s) not being the presently active microphone unit from being supplied to the output transducer.

22 Claims, 2 Drawing Sheets

(51) Int. Cl.
| | | |
|---|---|---|
| *H04R 25/00* | (2006.01) | |
| *G10L 25/21* | (2013.01) | |
| *G10L 25/84* | (2013.01) | |
| *H04R 1/40* | (2006.01) | |
| *G10L 25/51* | (2013.01) | |
| *H04M 3/56* | (2006.01) | |

(52) U.S. Cl.
CPC .............. *H04R 1/406* (2013.01); *H04R 25/43* (2013.01); *G10L 25/51* (2013.01); *H04M 3/568* (2013.01); *H04M 2203/5072* (2013.01); *H04R 25/554* (2013.01); *H04R 2225/55* (2013.01)

(58) Field of Classification Search
CPC ........... H04R 25/407; H04R 25/554; H04R 2225/55; G06F 3/16; G06F 3/165; H04M 3/568; H04M 2203/5072; G10L 25/21; G10L 25/51; G10L 25/78; G10L 25/84
See application file for complete search history.

(56) References Cited

U.S. PATENT DOCUMENTS

| | | | | |
|---|---|---|---|---|
| 7,346,176 | B1* | 3/2008 | Bernardi | H04R 3/005 381/313 |
| 7,561,700 | B1* | 7/2009 | Bernardi | H04R 3/005 381/313 |
| 8,244,528 | B2* | 8/2012 | Niemisto | G10L 25/78 704/233 |
| 8,666,090 | B1* | 3/2014 | Townsend | H04R 3/005 381/111 |
| 2001/0053132 | A1 | 12/2001 | Attimont et al. | |
| 2003/0059061 | A1* | 3/2003 | Tsuji | H04M 3/569 381/92 |
| 2003/0198328 | A1 | 10/2003 | Li | |
| 2006/0013416 | A1 | 1/2006 | Truong et al. | |
| 2009/0034753 | A1* | 2/2009 | Yokomizo | G01S 3/8055 381/92 |
| 2010/0111324 | A1* | 5/2010 | Yeldener | H04M 9/082 381/92 |
| 2010/0135512 | A1 | 6/2010 | Haenggi et al. | |
| 2011/0044481 | A1* | 2/2011 | Marquis | H04R 25/405 381/313 |
| 2012/0224715 | A1 | 9/2012 | Kikkeri | |
| 2014/0139615 | A1* | 5/2014 | Graham | H04R 3/005 348/14.08 |
| 2015/0049885 | A1* | 2/2015 | Oestlund | H04R 27/00 381/123 |
| 2015/0049892 | A1* | 2/2015 | Petersen | H04R 25/554 381/315 |
| 2016/0057459 | A1 | 2/2016 | Rakib | |
| 2018/0176682 | A1* | 6/2018 | Goesnar | H04R 3/005 |

* cited by examiner

HEARING ASSISTANCE SYSTEM IN A MULTI-TALKER ACOUSTIC NETWORK

The invention relates to a hearing assistance system comprising a plurality of table microphone units for capturing audio signals and at least one hearing assistance device to be worn by a user and comprising a receiver unit for receiving audio signals from the table microphone units and an output transducer for stimulation of the user's hearing according to the received audio signals.

The use of wireless microphones allows hearing impaired persons to improve the signal to noise ratio (SNR) of speech of other persons who are remote from the listener and/or who are in noisy surroundings. One example of the use of wireless microphones is the so-called lapel use case, wherein the persons of interest wear a wireless microphone, usually on the chest; another example is the so-called conference use case, wherein a wireless microphone is placed on a table to capture voices of persons sitting at the table in an omnidirectional way.

A multi-talker network (MTN) is a group of several wireless microphones which is able to capture speech from several persons. Typically, the number of microphones which may transmit their audio signals at the same time, i.e. the number of active microphones, is limited. For example, in some systems all microphones have to share a single channel or network, and only one microphone can be active at a time.

Thus, in such MTN systems it is necessary to select the presently active microphone. A particularly convenient selection method is to use a transmission request mechanism based on voice activity detection. An example of such system is described in WO 2008/074350 A1, wherein the MTN comprises a plurality of body-worn wireless microphones having a directional characteristic, wherein at a time only one of the microphones is allowed to transmit its audio signals via the MTN to the ear level receiver units. The active microphone is determined by voice activity detection, and if more than one of the microphones detects voice activity, the right to transmit is prioritized according to a first come principle, i.e. the microphone which has detected voice activity first remains the active microphone until the voice activity detector (VAD) detects that the speaker has stopped speaking.

However, such system usually has two antagonistic constraints, since the VAD has to be very fast—in order to not miss the start of the speech—and, at the same time, the VAD has to be very robust—in order to avoid false detections so that the listener will not miss parts of a sentence because of unwanted microphone switching. Robustness typically is achieved by the use of body-worn directional microphones (lapel microphones).

EP 2 701 405 A2 relates to a conferencing device which localizes the talker by comparing the energy of various microphone beams in order to direct the acoustic beamformer towards the localized talker direction. U.S. Pat. No. 8,976,712 B2 relates to an audio and video conferencing system, wherein an improved bridge architecture is used for controlling functions of conference end points. U.S. Pat. No. 6,469,732 B1 and U.S. Pat. No. 6,618,073 B1 relate to a video conference system comprising four microphones, wherein voice activity and the time of arrival relative to the other microphones are detected for each microphone. The differences in the delay of the time of arrival are used for estimating the position of the speaker so that the camera of the video system can be directed accordingly.

U.S. Pat. No. 7,783,063 B2 relates to a system for digitally linking multiple microphones and managing microphone signals, wherein the microphone signals are arbitrated in order to enable distributed automatic microphone mixers to behave as a single mixer.

US 2012/0294446 A1 relates to a method of separating two mixed sound sources by applying blind source separation.

In general, the usability of lapel microphones or pass-around microphones is limited in a meeting situation, in particular if only one of the lapel microphones is allowed to transmit its audio signals at a time, since then a natural dialog may be prevented due to clipping of sentences when two talkers overlap.

It is an object of the invention to provide for a hearing assistance system comprising at least two wireless microphone units which allows for convenient handling and high speech quality in meeting situations. It is a further object to provide for a corresponding hearing assistance method.

According to the invention, these objects are achieved by a system as defined in the claims.

The invention is beneficial in that, by using at least two table microphone units, each comprising a microphone with an omni-directional characteristic, and by controlling the microphone units such that at a time only one of the microphone units can be active, depending on the voice activity as detected by the microphone units, a system is achieved which allows for convenient handling of the microphone units in a meeting situation (wherein the table microphone units may remain stationary on a meeting table) and which provides for good speech quality by avoiding unnecessary switching of the microphones (that microphone unit which has detected voice activity first may remain the active microphone unit as long as it continuous to detect voice activity) and by avoiding increased noise and additional reverberation effect which typically result from mixing the signal of two omnidirectional microphones.

Preferred embodiments of the invention are defined in the dependent claims.

Hereinafter, examples of the invention will be illustrated by reference to the attached drawings, wherein.

Figure 1:
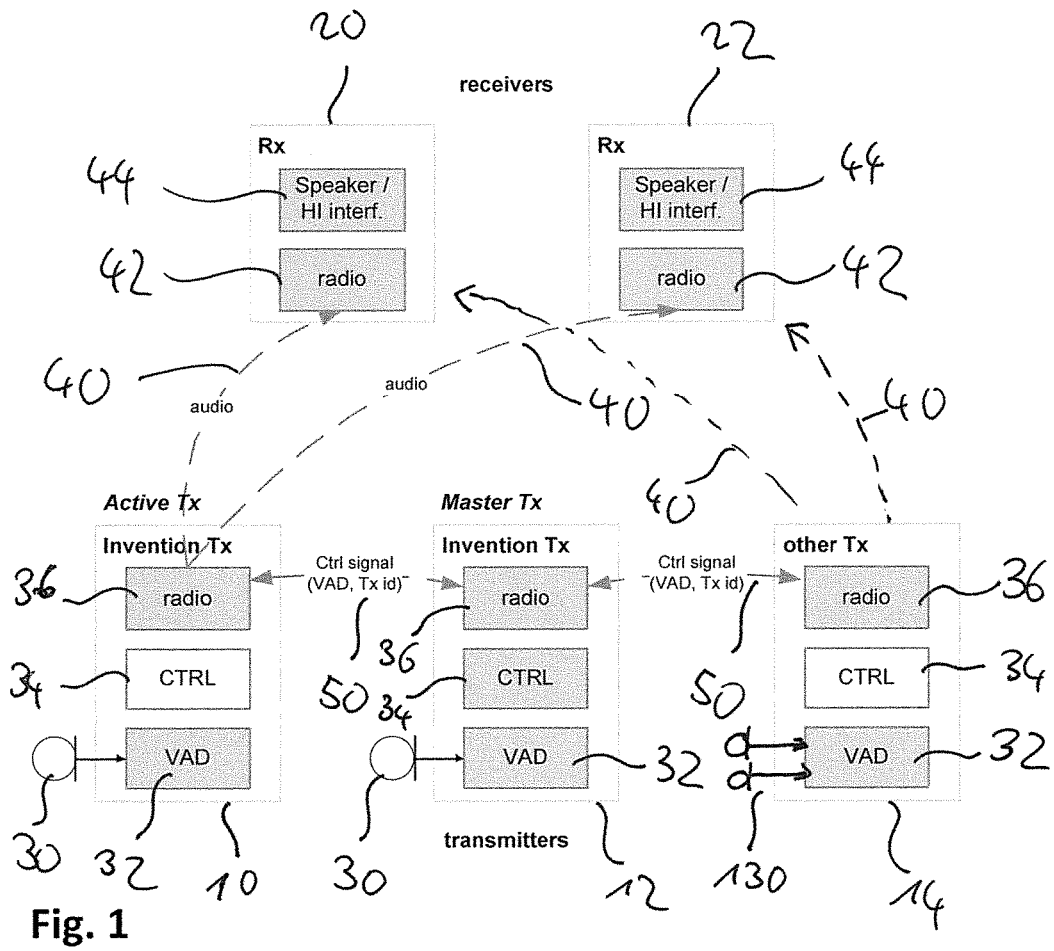
FIG. 1 is an example of a block diagram of a hearing assistance system according to the invention.

In FIG. 1 an example of a block diagram of a hearing assistance system according to the invention is shown, which comprises at least two table microphone units 10, 12 and at least one hearing assistance device 20 to be worn by a user. Typically, the system also comprises at least a second hearing device 22. Preferably, the hearing systems devices 20, 22 are ear level devices, such as hearing aids, which form a binaural arrangement for stimulating both ears of the user.

Each table microphone unit 10, 12 comprises a microphone 30 having an omnidirectional characteristic for capturing audio signals from a speaker's voice, an energy-based voice activity detector (VAD) 32 for detecting whether the respective microphone 30 presently captures audio signals from a speaker's voice, a control unit 34 for controlling operation of the respective microphone unit 10, 12, and a transmitter (typically a transceiver) 36 for transmitting the captured audio signals via a wireless audio link 40 to the hearing assistance devices 20, 22. Further, the microphone units 10, 12 may also include an audio signal processing unit (not shown in FIG. 1) for processing the audio signals captured by the microphone 30 prior to transmission of the audio signals via the wireless audio link 40. In such case, the table microphone unit may comprise not only one microphone but rather a plurality of microphones, wherein the audio signals captured by the microphones are supplied to the audio signal processing unit which processes the audio signals in such a manner that the output audio signal of the audio signal processing unit has an omnidirectional characteristic.

Each hearing assistance device 20, 22 comprises a receiver unit 42 for receiving audio signals via the wireless audio link 40 and an output transducer 44, such as a loudspeaker, for stimulation of the user's hearing according to the received audio signals. The receiver unit 42 may be integrated within the hearing systems device 20, 22, or it may be provided as a separate component which is mechanically and electrically connected to a hearing instrument comprising the output transducer 22 via a suitable interface. The hearing assistance device 20, 22 may be a device for acoustic stimulation of the hearing, such as a hearing aid; alternatively, it may be an auditory prosthesis for neural stimulation, such as a cochlea implant.

The wireless audio link 40 typically is a digital link, for example having carrier frequencies in the 2.4 GHz ISM band; the link 40 typically uses frequency hopping. According to one example, the wireless link 40 may comprise a TDMA frame structure for unidirectional broadcast transmission of audio signal data packets, without individually addressing the receiver units 42.

The microphone units 10, 12 are controlled in such a manner that, at a time, one of the microphone units 10, 12 is selected as the presently active microphone unit, with only the presently active microphone unit, i.e. the microphone unit presently having the "active" status, being allowed to transmit its audio signals via the wireless audio link 40 so as to be received by the hearing systems devices 20, 22, so that only the audio signals captured by the presently active microphone unit 10, 12 may be supplied to the output transducer 44 of the hearing systems devices 20, 22, while the "non-active" microphone unit is prevented from transmitting its audio signals via the wireless audio link 40.

In case that only one of the microphone units 10, 12 detects voice activity, that one of the microphone units 10, 12 will be selected as the presently active microphone unit and is allowed to transmit its audio signals via the wireless link 40. In case that more than one of the microphone units 10, 12 detects voice activity, a "first come" principle may be applied which means that one of the microphone units 10, 12 which has detected voice activity first remains the presently active microphone unit as long as it still detects voice activity, at least unless an override criterion is found to be fulfilled after some time. In other words, under certain exceptional conditions the basic "first come" principle may be temporarily suspended after a certain time period.

For example, the VAD 32 of the microphone units 10, 12 may be configured to estimate the SNR of the audio signals captured by the respective microphone 30, with the override criterion being that the SNR of the audio signal captured by the presently active one of the microphone unit 10, 12 is lower by a certain degree than the SNR of the audio signal captured by another one of the microphone units 10, 12 for which voice activity is presently detected. To this end, the estimated SNRs of the audio signals captured by the microphone units 10, 12 for which voice activity is detected may be periodically compared in order to periodically determine whether the override criterion is fulfilled. Such overriding of the "first come" principle is beneficial in cases in which the active microphone unit 10, 12 stays "locked" due to continuous triggering of the VAD 32 caused by people speaking "on top" of each other.

In order to avoid "wrong" switching between the microphone units, the VADs 32 may work with a sufficient release time (or hangover time), typically 100 ms to 500 ms. According to one example, the release time may be adjustable, so that the VAD 32 of the presently active microphone unit may apply an increased release time (or hangover time), typically an extra 50 ms to 150 ms, which preferably is determined according to the acoustic parameters of the room, in which the system is used; for example, the more reverberant the room is the longer the release time should be.

According to one example, the VADs 32 may be configured to obtain an energy level of the audio signal captured by the respective microphone 30 by a frequency-weighted energy measurement, wherein the obtained energy level is compared to an energy threshold in order to detect voice activity.

Preferably, the VAD 32 is configured to use an adaptive energy threshold which is variable as a function of a surrounding noise level as estimated by the VAD 32, wherein the energy threshold increases with increasing estimated surrounding noise level, and wherein voice activity is detected once the energy level measured by the VAD is above the energy threshold. Thereby, false triggering of the VAD due to noise can be reduced or prevented.

According to one embodiment, the VAD 32 may be configured as an "Extended VAD" ("EVAD") which contains multiple VAD instances with different parameterization (while the VAD preferably is energy-based, also parameters other than energy thresholds may be used for voice activity detection, such as estimated pitch, probability distribution of energy, SNR, etc.), wherein the sum of the output of the VAD instances is representative of a confidence value of the voice activity detection, with the confidence value being the higher the higher the sum is, and wherein the confidence value is taken into account when selecting the active microphone; for example, such EVAD may contain three of the VAD instances. While a simple VAD provides a binary output ("1": "voice on"/"0": "voice off"), an EVAD allows to make finer decisions regarding voice activity. For example, while the value "0" stands for "voice off", an output value "1" may stand for "voice on, low confidence", a value "2" may stand for "voice on, medium confidence", and a value "3" may stand for "voice on, high confidence". Such EVAD may be used, for example, in conjunction with different thresholds for different VAD decisions as will be discussed hereinafter in conjunction with FIG. 3. Similarly, the SNR estimation by the VAD as mentioned above may be used in conjunction with different thresholds for different VAD decisions.

Figures 2, 3:
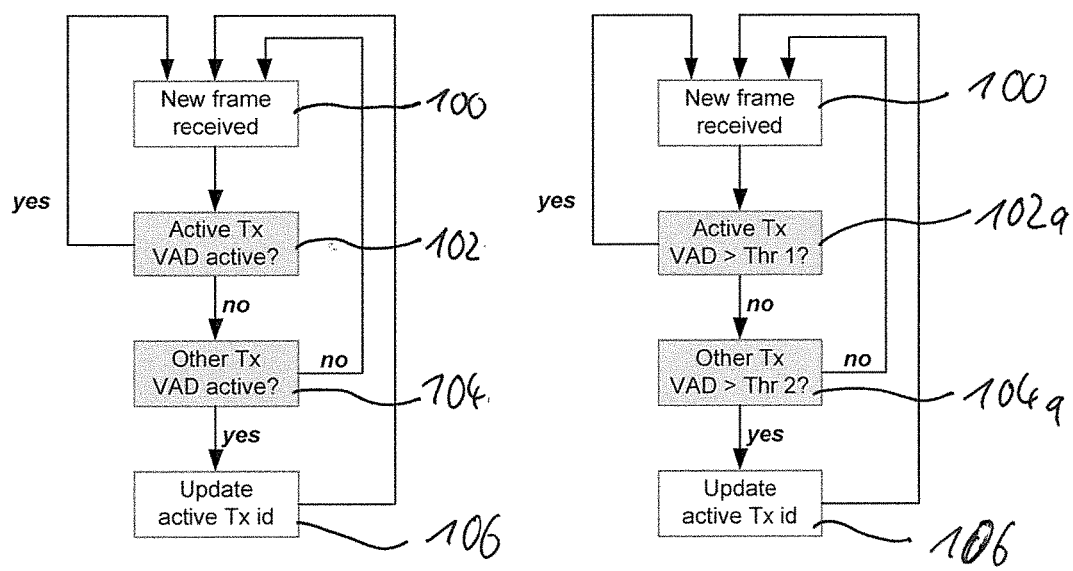
FIG. 2 is a flow diagram of an example of the decision concerning the presently active microphone unit in a hearing assistance system.
FIG. 3 is a flow diagram of an alternative example of the decision concerning the presently active microphone unit.

FIG. 2 is a flow diagram of an example of a decision process for selecting the presently active microphone unit 10, 12. Typically, the decision is updated each time a new audio frame is received by the microphone unit (step 100), which typically may happen every few msec. In step 102 it is checked whether the VAD 32 of the presently active microphone unit detects voice activity, i.e. whether the energy in the audio signal is found to be above the energy threshold of the VAD 32. If the answer is "yes", the presently active microphone unit remains the presently active microphone unit, so that no changes are applied to the system. If, however, the answer is "no", i.e. if the VAD 32 of the presently active microphone unit does no longer detect voice activity, it is checked in step 104 whether the VAD 32 of another microphone unit presently detects voice activity. If the answer is "no", the presently active microphone unit remains the presently active microphone unit until the decision process starts again when a new audio frame is received in step 100. If, however, the answer is "yes", that one of the microphone units becomes the new active microphone unit in step 106, i.e. the ID of the presently active microphone unit is updated accordingly, and the decision process starts again when the next audio frame is received in step 100.

In the example of FIG. 2 the same energy threshold is applied for both the decision 102 concerning the voice activity of the presently active microphone unit and in decision 104 concerning the voice activity of the other microphone unit(s). By contrast, FIG. 3 relates to an alternative example, wherein different thresholds are applied in the decisions in steps 102*a* and 104*a*. In the example of FIG. 3, the threshold "Thr2" applied in the second decision in step 104*a* is higher than the threshold "Thr1" applied in the first decision in step 102*a*; i.e. the "hurdle" is higher for a "new" microphone unit to become the presently active microphone unit than is the "hurdle" for the presently active microphone unit to remain the presently active microphone unit. This means, that, for example, when using an EVAD, the required confidence value for deciding that there is voice activity is higher for the "new" microphone unit than for the presently active microphone unit. This may apply similarly for a VAD including SNR estimation, i.e. the in the second decision in step 104*a* the requirements concerning SNR may be stricter (i.e., require a higher SNR) than in the first decision in step 102*a*.

According to one example, the decision process of FIG. 3 may be used to implement an increased release time/hangover time for the VAD of the presently active microphone unit even without explicit knowledge of the presently active microphone unit by the system. In such case, when using an EVAD a hangover may be added to the EVAD in a manner so that the EVAD signal may be maintained for a certain time period, e.g. 100 ms, to indicate that EVAD finds a value above Thr1 but below or equal to Thr2), although in fact the EVAD value is less than Thr1. Thus, since the decision in step 102*a* applies only to the presently active microphone unit, also such increased release/hangover time applies only to the presently active microphone unit (the limit of the "fake" EVAD to a value below or equal to Thr2 also insures that the decision in step 104*a* is negative, i.e. that the increased release/hangover time does not apply to the other microphone units).

According to one embodiment, the transmission control of the microphone units 10, 12 by selection of the presently active microphone unit may be effected by a designated one of the microphone units 10, 12 which acts as a master unit (in the illustration of FIG. 1, the microphone unit 12 acts as the master unit, whereas the microphone unit 10 acts as a slave unit). In such a master-slave architecture, the microphone units 10, 12 exchange signals representative of the output of the respective VAD 32 and the ID of the presently active microphone unit via a wireless control link 50. The wireless control link 50 may use the same channel(s) as the wireless audio link 40 (same carrier frequencies, same protocol), or it may be separate from the wireless audio link 40. The master unit 12 regularly/periodically decides on the presently active microphone unit based on the VAD signals received from the other microphone units and its own VAD output signal and transmits a signal indicative of the presently active microphone unit via the wireless control link 50 to the other microphone unit(s). A microphone unit 10, 12 is allowed to transmit its audio signals via the audio link 40 only in case that it is notified by the master unit 12 that it is the presently active microphone unit.

The role of being the master unit may be fixed, i.e. always the same microphone unit may be the master unit, or it may change dynamically during usage, i.e. different microphone units may act as the master unit.

According to an alternative embodiment, part of the decision concerning the active microphone unit may be distributed on several microphone units 10, 12. For example, in order to reduce network traffic, each microphone unit may be configured to transmit its VAD signal only in case that the respective microphone units finds that the presently active microphone unit does not detect voice activity (each microphone unit 10, 12 is aware of the VAD status of the presently active microphone unit due to the respective VAD signals received from the presently active microphone unit via the control link 50).

According to another alternative embodiment, the decision concerning presently active microphone unit could be fully distributed on all microphone units 10, 12 by configuring each microphone unit such that senses, via the transceiver 36, whether another one of the microphone unit presently transmits audio signals via the link 40, wherein each microphone unit may initiate transmission of its audio signals via the wireless audio link 40 when voice activity of its own microphone 30 is detected, provided that none of the other microphone units is found to presently transmit audio signals via the wireless audio link 40.

In addition to the table microphone units 10, 12, the hearing assistance system may include other (non-table) wireless microphone units (in FIG. 1 such additional microphone unit is indicated at 14) which may include a microphone arrangement 130 which has a directional characteristic, an energy based VAD 32, a control unit 34 and a transceiver 36 which allows to communicate with the other microphone unit 10, 12 via the wireless control link 50 and to transmit audio signals captured by the microphone arrangement 130 via the wireless audio link 40 to the hearing systems devices 20, 22. Typically, such additional microphone unit 14 may be a personal microphone unit to be worn at a user's body or to be held in a user's hand in order to capture, via the microphone arrangement 130, audio signals from the user's voice.

According to one embodiment, such additional (non-table) microphone units 14 may be treated, with regard to their right to transmit their audio signals, in the same manner as the table microphone units 10, 12, i.e. based on a "first come" principle, if the additional microphone unit 14 is the only microphone unit which detects voice activity, the additional microphone unit will be selected as the presently active microphone unit, and if more than one of the microphone units detects voice activity, that one which has detected voice activity first remains the presently active microphone unit.

According to another embodiment, the additional microphone units 14 may be given priority over the table microphone units 10, 12, so that one of the table microphone units 10, 12 may become the presently active microphone unit only if none of the additional microphone units 14 detects voice activity.

According to a variant of this embodiment, only a certain one of the additional microphone units 14 may be given priority over the table microphone units, so that one of the table microphone units 10, 12 may become the active microphone unit only if for that certain one of the additional microphone units 14 no voice activity is detected.

Figure 4:
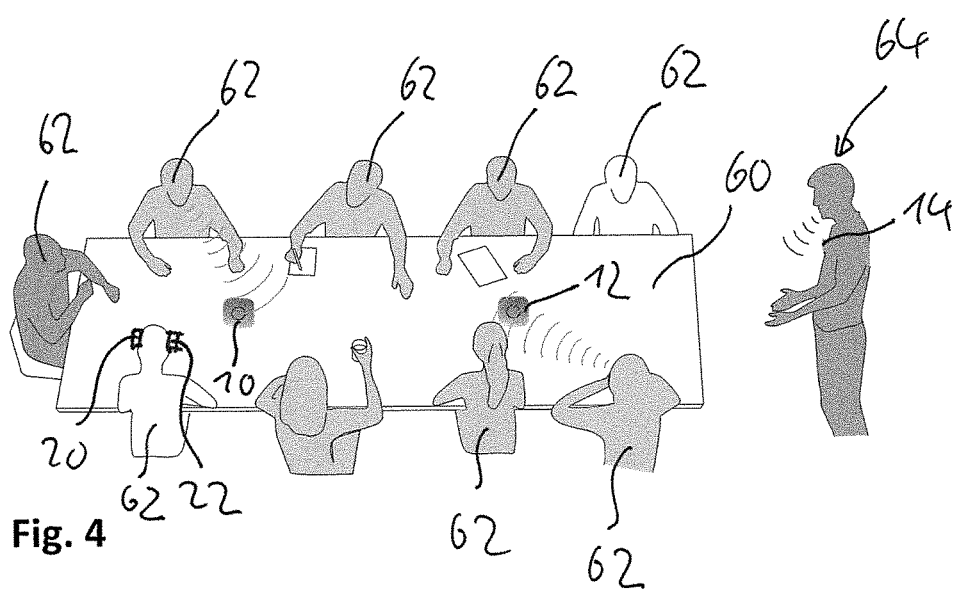
FIG. 4 is an illustration of a typical use situation of the system of FIG. 1

In FIG. 4 a typical use case of a hearing assistance system according to the invention is illustrated, wherein two table microphone units 10, 12 are placed on a table 60 around which a group of speakers 62, for example students in a class room, is sitting while another speaker 64, for example a teacher, wearing a personal microphone unit 14 may speak to the persons 62 sitting at the table 60. Some or all of the persons 62 at the table may use hearing system devices 20, 22. One of the microphone units 10, 12 and 14 is selected as the presently active microphone unit which is allowed to transmit its audio signals to the hearing systems devices 20, 22 via the wireless audio link 40.

The invention claimed is:

1. A multi-talker acoustic network system for providing hearing assistance to a user, comprising:
   two table microphone units, wherein the two table microphone units are configured to capture audio signals, each of the two table microphone units comprising a microphone arrangement having an omnidirectional characteristic, a voice activity detector ("VAD") for detecting voice activity of the microphone arrangement, and a transmitter for transmitting the captured audio signals via a wireless audio link;
   a control unit for selecting one of the table microphone units as an active microphone unit, wherein the control unit is configured to select, in case that at a time only for one of the table microphone units voice activity is detected, that one of the table microphone units as the active microphone unit, and to select, in case that at a time for more than one of the table microphone units voice activity is detected, at least for a time period that one of the table microphone units as the active microphone unit that has detected the voice activity first as the active microphone unit; and
   a hearing assistance device comprising a receiver unit for receiving audio signals captured by the active microphone unit and an output transducer;
   wherein the control unit is configured to allow only the audio signals captured by the active microphone unit to be transmitted via the wireless audio link to the hearing assistance device.

2. The system of claim 1, wherein the control unit is configured to periodically check in a first decision whether the active microphone unit still detects voice activity and, if so, to maintain the active microphone unit and, if not, to check in a second decision whether another one of the table microphone units detects voice activity, and wherein, if in the second decision another one of the table microphone units is found to detect voice activity, that table microphone is selected to be the active microphone unit.

3. The system of claim 2, wherein in the first decision and in the second decision an energy threshold is to be applied to detect voice activity.

4. The system of claim 2, wherein in the first decision a first energy threshold is to be applied to detect voice activity, wherein in the second decision a second energy threshold is to be applied to detect voice activity, and wherein the second energy threshold is higher than the first energy threshold.

5. The system of claim 4, wherein the control unit is configured to repeat the first decision and the second decision each time a new frame of the captured audio signals is received.

6. The system of claim 5, wherein the control unit is configured to maintain the selection of the active microphone unit as long as voice activity is continuously detected for the selected microphone unit.

7. The system of claim 6, wherein the system is configured to estimate a signal-to-noise ratio ("SNR") of the audio signals captured by the table microphone units and wherein an override criterion is that the SNR of the audio signal captured by the active one of the microphone units is lower by a degree than the SNR of the audio signal captured by one of the table microphone units for which voice activity is detected.

8. The system of claim 7, wherein the control unit is configured to periodically compare the estimated SNRs of the audio signals captured by the table microphone units for which voice activity is detected to periodically determine whether the override criterion is fulfilled.

9. The system of claim 8, wherein the VAD is configured to obtain an energy level of the audio signal captured by the microphone by a frequency-weighted energy measurement, and wherein the obtained energy level is compared to an energy threshold to detect voice activity.

10. The system of claim 9, wherein the VAD is configured to use an adaptive energy threshold that is variable as a function of a surrounding noise level as estimated by the VAD, wherein the energy threshold increases with increasing estimated surrounding noise level, and wherein voice activity is detected once the energy level measured by the VAD is above the energy threshold.

11. The system of claim 10, wherein the VAD is configured to contain multiple VAD instances with different parametrization, wherein the sum of the output of the VAD instances is representative of a confidence value of the voice activity detection, with the confidence value being the higher the higher the sum is, and wherein the confidence value is taken into account in the control unit when selecting one of the microphone units as the active microphone unit.

12. A method for providing hearing assistance to a user with at least two microphone units, the method comprising:
   detecting, by a voice detection unit, voice activity from one of the at least two microphone units:
   selecting, via a control unit, one of the at least two microphone units as an active microphone unit based on the detected voice activity,
     wherein when one of the at least two microphone units detects voice activity that one of the at least two microphone units is selected as the active microphone unit, and
     wherein when more than one of the at least two microphone units detect voice activity, the microphone unit that detected the voice activity first is selected as the active microphone unit, wherein the selection of the active microphone unit is maintained with a release time;
   transmitting audio signals captured by the active microphone unit via a wireless audio link to a hearing assistance device comprising a receiver unit for receiving audio signals captured by the active microphone unit and an output transducer; and
   providing audio, via the output transducer based on the received audio signals, wherein audio signals of one of the at least two microphone units that is not active are prevented from being supplied to the output transducer.

13. The method of claim 12, wherein the at least two microphones each have a voice detection unit (VAD) configured to detect voice.

14. The method of claim 13, wherein the VAD is configured to determine an energy level of an audio signal captured by a microphone by a frequency-weighted energy measurement.

15. The method of claim 12, wherein selecting is also based on a signal-to-noise ratio (SNR) of the voice activity.

16. A non-transitory computer-readable medium storing instructions that when executed by a processor cause a system to perform the following operations, the operations comprising:
   detecting voice activity at a first microphone unit;
   detecting the voice activity at a second microphone unit;
   determining whether the first or the second microphone unit detected the voice activity first;
   selecting the first or the second microphone unit as an active microphone unit based on determining whether the first or the second microphone unit detected the voice activity first;
   transmitting audio received, by only the active microphone unit, to a hearing device;
   determining that the active microphone unit is no longer detecting the voice activity; and
   switching the active microphone unit from the first microphone unit to the second microphone unit or from the second microphone to the first microphone unit based on determining that the active microphone unit is no longer detecting the voice activity and a non-active microphone unit is detecting the voice activity or new voice activity, wherein the non-active microphone unit is the first or second microphone unit.

17. The non-transitory computer-readable medium of claim 16, wherein detecting voice activity is based on an energy level of audio signals captured at the first or second microphone unit.

18. The non-transitory computer-readable medium of claim 16, wherein the operations further comprise:
   applying an override function to the active microphone unit based on a signal to noise ratio of audio signals received at the first and second microphone unit, wherein the override function causes the system to use another microphone unit to provide audio to a hearing device.

19. The non-transitory computer-readable medium of claim 16, the operations further comprising:
   transmitting processed audio to the hearing device after a release time period has expired.

20. The system of claim 1, wherein each VAD is configured to maintain a positive VAD output signal for a time period after the VAD is no longer detected to enable a release time.

21. The method of claim 12, wherein the method further comprises:
   adjusting the release time based on acoustic parameters.

22. The non-transitory computer-readable medium of claim 16, the operations further comprising:
   adjusting a release time based on acoustic parameters, wherein the release time is associated with a time that the between switching from the first microphone unit to the second microphone unit or vice versa.

* * * * *